(12) United States Patent
Lu et al.

(10) Patent No.: US 10,300,662 B2
(45) Date of Patent: May 28, 2019

(54) METHOD OF THREE-DIMENSIONAL PRINTING AND SYSTEM THEREOF

(71) Applicants: XYZprinting, Inc., New Taipei (TW); Kinpo Electronics, Inc., New Taipei (TW)

(72) Inventors: Ting-Yu Lu, New Taipei (TW); Ching-Hua Su, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 222 days.

(21) Appl. No.: 15/616,946

(22) Filed: Jun. 8, 2017

(65) Prior Publication Data

US 2018/0290399 A1   Oct. 11, 2018

(30) Foreign Application Priority Data

Apr. 10, 2017   (CN) .......................... 2017 1 0229255

(51) Int. Cl.
| | |
|---|---|
| *G05B 19/4099* | (2006.01) |
| *G06F 17/50* | (2006.01) |
| *B29C 64/386* | (2017.01) |
| *B33Y 50/00* | (2015.01) |
| *B29C 64/124* | (2017.01) |

(Continued)

(52) U.S. Cl.
CPC .......... *B29C 64/386* (2017.08); *B29C 64/106* (2017.08); *B29C 64/112* (2017.08); *B29C 64/118* (2017.08); *B29C 64/124* (2017.08); *B29C 64/209* (2017.08); *B29C 64/264* (2017.08); *B29C 64/393* (2017.08); *B33Y 10/00* (2014.12); *B33Y 30/00* (2014.12); *B33Y 50/00* (2014.12); *B33Y 50/02* (2014.12); *G06F 7/00* (2013.01); *G05B 2219/49013* (2013.01); *G05B 2219/49021* (2013.01); *G05B 2219/49023* (2013.01)

(58) Field of Classification Search
CPC ... B29C 64/106; B29C 64/112; B29C 64/118; B29C 64/124; B29C 64/20; B29C 64/264; B29C 64/386; B29C 64/393; B33Y 10/00; B33Y 30/00; G05B 19/4099; G05B 2219/49013; G05B 2219/49021; G05B 2219/49023; G06F 17/50
USPC .... 264/40.1, 308, 401; 425/135, 174.4, 375; 700/98, 119, 120
See application file for complete search history.

(56) References Cited

U.S. PATENT DOCUMENTS

| | | | | |
|---|---|---|---|---|
| 6,401,002 B1 * | 6/2002 | Jang | .................. | G05B 19/4099 264/401 X |
| 6,505,089 B1 * | 1/2003 | Yang | .................. | G05B 19/4099 264/308 |
| 2004/0159978 A1 * | 8/2004 | Nielsen | ................. | B29C 64/112 264/308 |

* cited by examiner

*Primary Examiner* — Leo B Tentoni
(74) *Attorney, Agent, or Firm* — JCIPRNET (57) ABSTRACT

A method and a system of three-dimensional (3D) printing are provided. The method of 3D printing is adapted to a 3D printing apparatus and includes following steps: slicing a 3D object model into a plurality of sub-slicing layers according to a printing plane; merging a default number of adjacent sub-slicing layers into a plurality of grey-scale slicing layers; and, printing a 3D object according to the grey-scale slicing layers. The thickness of each sub-slicing layer is thinner than the thickness of a default layer used whenever the 3D printing apparatus performs a single printing process. The thickness of each of the grey-scale slicing layers is equal to the thickness of the default layer used whenever the 3D printing apparatus performs the single printing process.

14 Claims, 7 Drawing Sheets

(51) Int. Cl.
*B29C 64/106* (2017.01)
*B33Y 10/00* (2015.01)
*B33Y 50/02* (2015.01)
*B29C 64/264* (2017.01)
*B29C 64/112* (2017.01)
*B29C 64/209* (2017.01)
*B29C 64/393* (2017.01)
*B33Y 30/00* (2015.01)
*B29C 64/118* (2017.01)
*G06F 7/00* (2006.01)

FIG. 5C

METHOD OF THREE-DIMENSIONAL PRINTING AND SYSTEM THEREOF

CROSS-REFERENCE TO RELATED APPLICATION

This application claims the priority benefit of China application serial no. 201710229255.9, filed on Apr. 10, 2017. The entirety of the above-mentioned patent application is hereby incorporated by reference herein and made a part of this specification.

TECHNICAL FIELD

The disclosure relates to a three-dimensional printing technique, and particularly relates to a method of three-dimensional printing and a system thereof.

BACKGROUND

In the conventional three-dimensional printing technique, it is common to slice a three-dimensional object model constructed by software such as a computer aided design (CAD) program into a plurality of thin cross-sectional layers. Then, a printing head of a three-dimensional printing apparatus may move along a printing plane above a printing base and output materials according to coordinates of a space (e.g., a space formed by an X-axis, a Y-axis, and a Z-axis) constructed in the three-dimensional object model, so as to dispatch the forming material in a desired shape of the cross-sectional layer. The forming materials deposited may be cured naturally or by heating or light irradiation, so as to form the cross-sectional layer as desired. Hence, by moving a printing module along a forming axis (i.e., Z-axis) layer-by-layer, the cross-sectional layers are stacked sequentially along the forming axis (i.e., Z-axis), thereby forming the three-dimensional object by curing the forming material layer-by-layer.

However, the edge of a real object is linear and continuous, whereas the edge of the three-dimensional object produced by three-dimensional printing is not necessarily continuous, as the object is formed by stacking the thin cross-sectional layers. For example, in the case where the edge of the three-dimensional object model along the Z-axis is declined, if the three-dimensional object is sliced into a plurality of cross-sectional layers, there will be a difference between the edges of the vertically adjacent cross-sectional layers after the slicing, and the inclination is not being presented as linear and continuous. When the cross-sectional layers have a greater thickness, there may even be a pattern visible to naked eyes.

To eliminate or reduce the pattern, it is common to compensate edge portions of the cross-sectional layers by slope compensation or Gaussian smoothing. Slope compensation refers to compensation by linear interpolation based on a slope of a line connecting the edges of two adjacent cross-sectional layers. However, the slopes at the left and right ends of the same cross-sectional layer may not be necessarily consistent. Thus, it may be difficult to determine the extent to which the compensation is made. Gaussian smoothing, on the other hand, is performed by carrying out Gaussian smoothing operation on the edge portion of each cross-sectional layer to reduce the edge difference between each cross-sectional layer and the adjacent cross-sectional layer. However, Gaussian smoothing may result in a greater difference between the three-dimensional object eventually printed and the three-dimensional object model constructed by the software. How to suppress the pattern without resulting in distortion thus remains as an issue for the researchers in the field to work on.

SUMMARY

The disclosure provides a system and a method of three-dimensional printing capable of reducing distortion at an edge of a three-dimensional printing object and effectively suppressing a pattern of the three-dimensional printing object along a forming axis (Z-axis).

A method of three-dimensional printing according to an embodiment of the disclosure is suitable for a three-dimensional printing apparatus. The method includes steps as follows: slicing a three-dimensional object model into a plurality of sub-slicing layers based on a printing plane; merging a default number of adjacent sub-slicing layers of the sub-slicing layers to form a plurality of grey-scale slicing layers; and performing three-dimensional printing based on the grey-scale slicing layers.

A system of three-dimensional printing according to an embodiment of the disclosure includes a three-dimensional printing apparatus and a processor coupled to the three-dimensional printing apparatus. The processor slices a three-dimensional object model into a plurality of sub-slicing layers based on a printing plane and merges a default number of adjacent sub-slicing layers of the sub-slicing layers to form a plurality of grey-scale slicing layers. The three-dimensional printing apparatus performs three-dimensional printing based on the grey-scale slicing layers.

Based on the above, in the system and the method of three-dimensional printing according to the embodiments of the disclosure, when slicing a three-dimensional object model, the three-dimensional object model may be simulatively sliced into the sub-slicing layer with a thickness thinner than the thickness of the default layer of the three-dimensional printing apparatus and then several sub-slicing layers are merged to form the grey-scale slicing layers whose thickness is equal to the thickness of the default layer. Accordingly, through merging, each pixel in the grey-scale slicing layer has more detailed object thickness information than the thickness of the default layer. In other words, the grey-scale value of each pixel in the grey-scale slicing layer corresponds to the object thickness information of the pixel in the grey-scale slicing layer. Accordingly, when the three-dimensional printing apparatus prints the respective grey-scale slicing layers layer-by-layer, the amount of the forming material or the intensity of the curing irradiation is controlled based on the grey-scale value of each pixel of the grey-scale slicing layer. Hence, the forming material on the edge of the grey-scale slicing layer may be materialized in an amount less than that in the object, so as to smooth the edge difference between the respective cross-sectional layers printed, thereby suppressing the pattern along the forming axis (Z-axis).

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
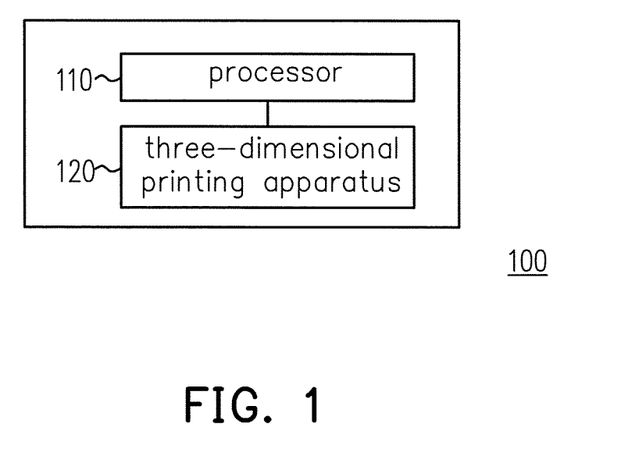
FIG. 1 is a block diagram illustrating a three-dimensional printing system according to an embodiment of the disclosure.

FIG. 1 is a block diagram illustrating a three-dimensional printing system according to an embodiment of the disclosure. Referring to FIG. 1, a three-dimensional printing system 100 includes a processor 110 and a three-dimensional printing apparatus 120. The processor 110 is a central processing unit, a graphic processing unit, a processing chip, for example, and is coupled to the three-dimensional printing apparatus 120. The processor 110 has two-dimensional (2D) and three-dimensional graphic processing abilities, as the processor 110 is capable of slicing a three-dimensional object model constructed by a computer-aided design (CAD) program into a plurality of layers based on a default layer thickness that the three-dimensional printing apparatus 120 is able to process and outputting the layers as an image file to serve as an input image file of the three-dimensional printing apparatus 120. A format of the image file is a bitmap (BMP) image file or a scalable vector graphic (SVG) file, for example.

The three-dimensional printing apparatus 120 has a printing module. The printing module is a printing module compatible with fused deposition modeling (FDM) where a printing nozzle sprays a forming material, for example, or a printing module compatible with digital light processing (DLP) where an irradiation module irradiates a shaping light pattern on a photocurable resin to shape the forming material, for example. The printing modules are able to receive grey-scale layers to form a three-dimensional printing object, and correspondingly adjust a concentration or an amount of the forming material based on a grey-scale value of each pixel. The three-dimensional printing apparatus 120 receives a plurality of image files output by the processor 110, and prints the forming material layer-by-layer based on the image files to Ruin respective forming blocks by the printing module. Then, the forming blocks are stacked along a forming axis (Z-axis) to faun the three-dimensional object as desired by the user. The three-dimensional printing apparatus according to the embodiment may be implemented with a printing head, a corresponding printing platform, and a corresponding computing processing device.

Figure 2:
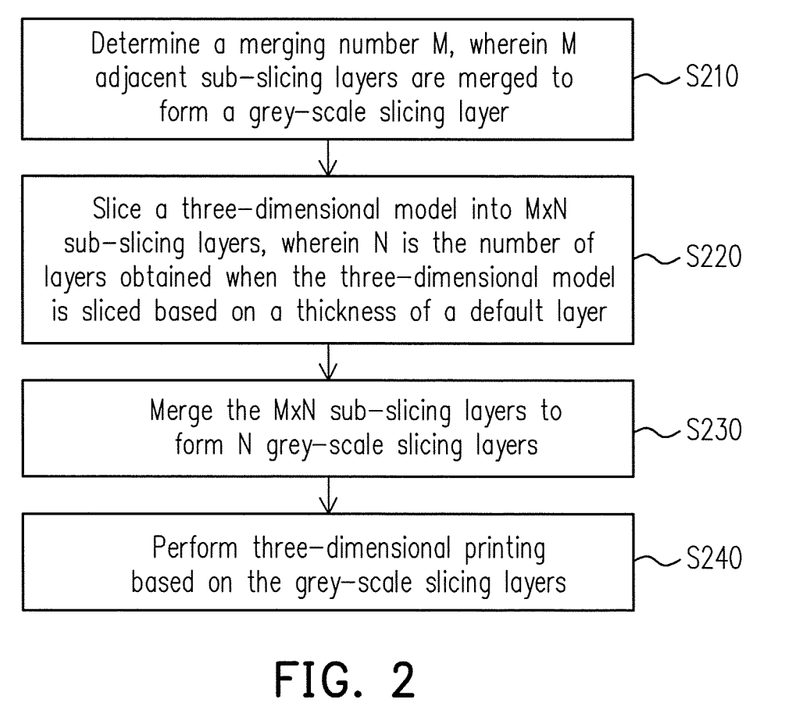
FIG. 2 is a flowchart illustrating a method of three-dimensional printing according to an embodiment of the disclosure.

FIG. 2 is a flowchart illustrating a method of three-dimensional printing according to an embodiment of the disclosure. Referring to FIGS. 1 and 2, at Step S210, the processor 110 may determine a merging number M of sub-slicing layers. The merging number M indicates that M adjacent sub-slicing layers are merged by the processor 110 to form a plurality of grey-scale slicing layers. In the embodiment, the merging number M may be set by a user input, a default value set in the three-dimensional printing system 100, or a number dynamically set by another program based on a printing condition.

When the three-dimensional object model is sliced based on a thickness of the default layer that the three-dimensional printing apparatus 120 is able to process, N layers are generated. Thus, at Step S220, the processor 110 sets a slicing thickness to be one m-th of the thickness of the default layer that the three-dimensional printing apparatus 120 is able to process. The three-dimensional object model is sliced based on the thickness to generate M×N sub-slicing layers. At Step S230, the processor 110 merges each M adjacent sub-slicing layers to generate N grey-scale slicing layers. In addition, the grey-scale slicing layers are output to the three-dimensional printing apparatus 120 as a plurality of image files in a format that the three-dimensional printing apparatus 120 is able to identify and process. At Step S240, the three-dimensional printing apparatus 120 carries out printing of the three-dimensional object by the printing module of the three-dimensional printing apparatus 120 based on the image files corresponding to the N grey-scale slicing layers.

Figure 3A:
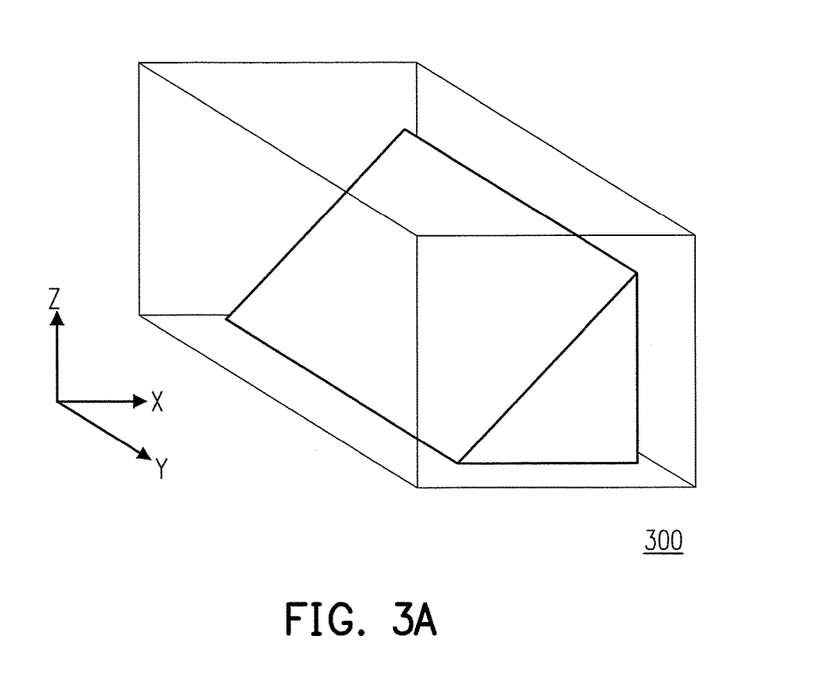
FIGS. 3A to 3F are schematic views illustrating slicing a three-dimensional object model into sub-slicing layers and merging the slicing layers according to an embodiment of the disclosure.
Figure 3B:
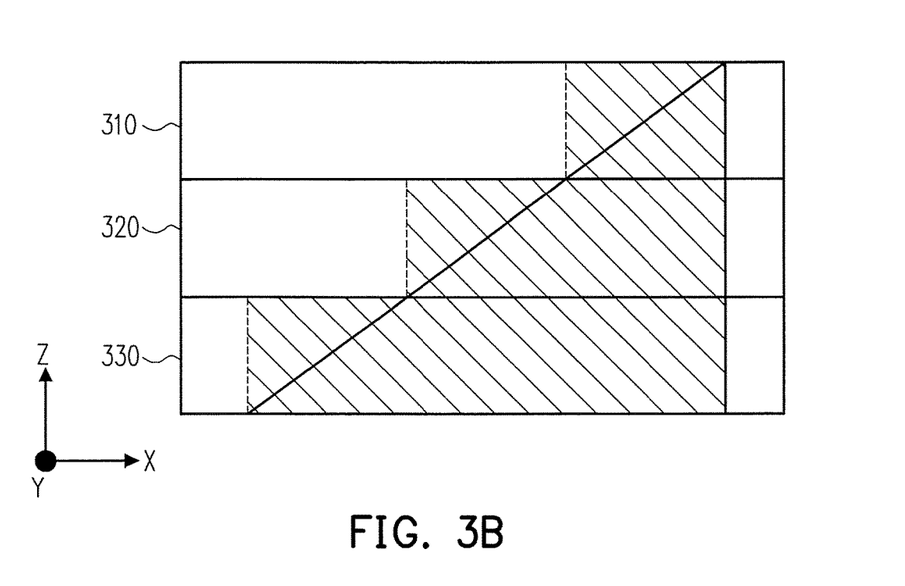
Figure 3C:
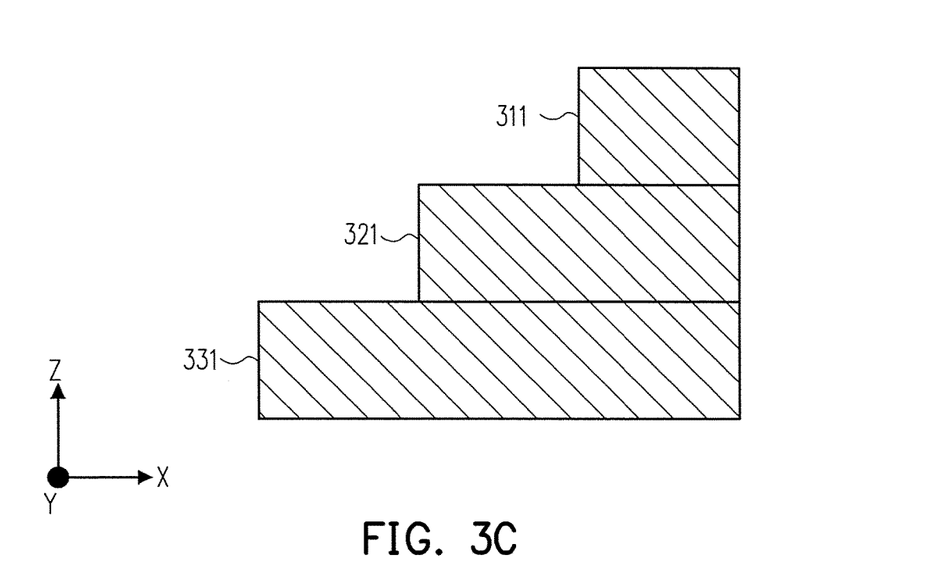
Figure 3D:
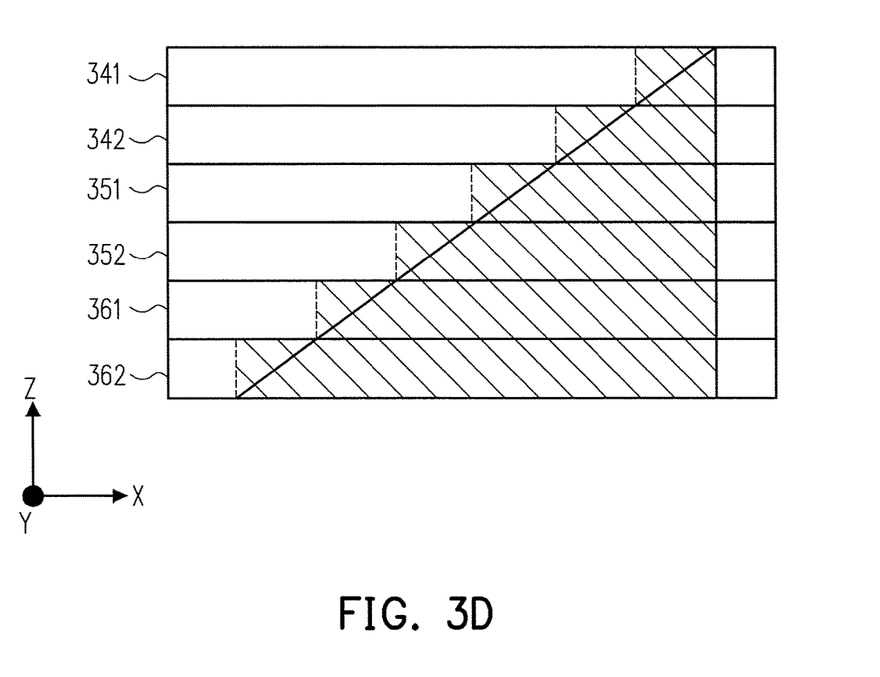
Figure 3E:
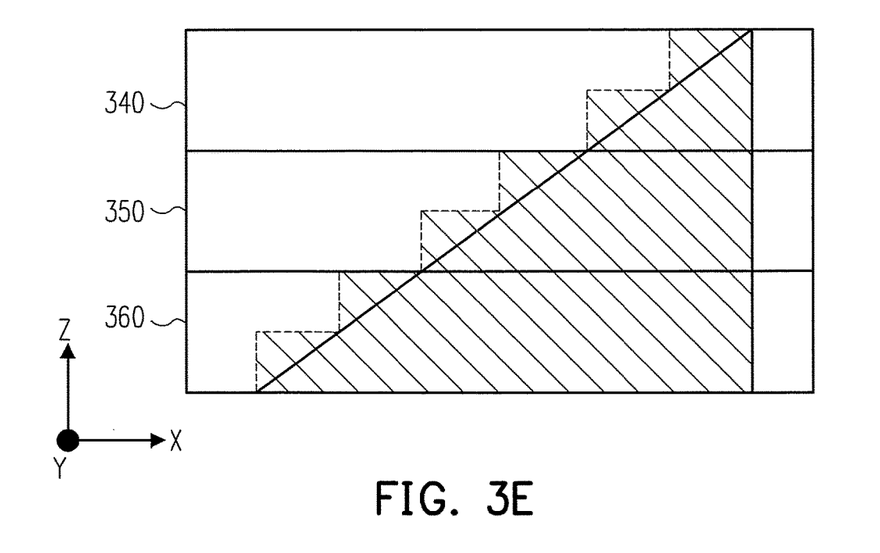
Figure 3F:
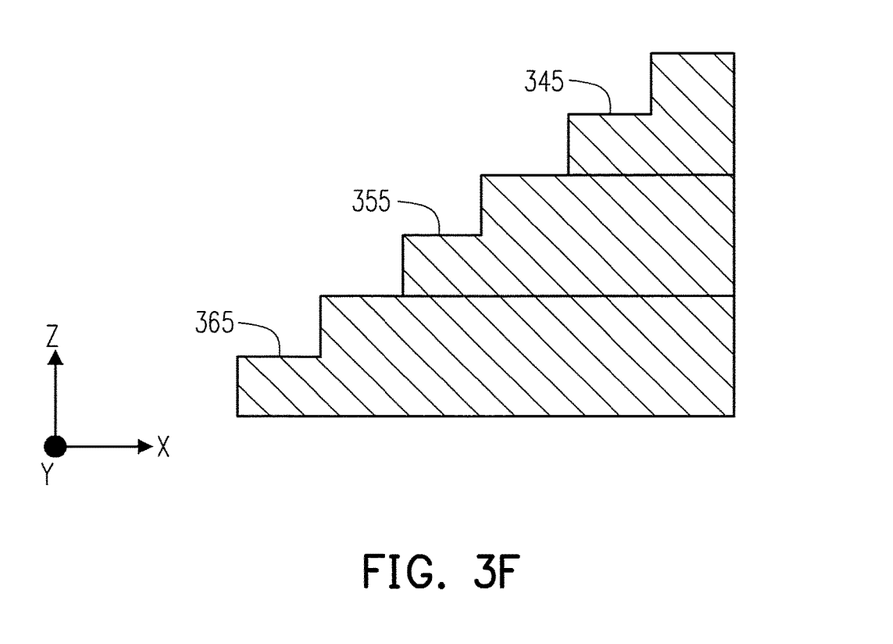

FIGS. 3A to 3F are schematic views illustrating slicing a three-dimensional object model into sub-slicing layers and merging the slicing layers according to an embodiment of the disclosure. A three-dimensional object model 300 of FIG. 3A is a triangular three-dimensional object model constructed by a design software. FIGS. 3B and 3C are views illustrating slicing of a three-dimensional object. FIGS. 3D to 3F are views illustrating examples of sub-slicing layers and grey-scale slicing layers after merging according to an embodiment of the disclosure. Referring to FIGS. 3B and 3C, FIG. 3B is a schematic side view illustrating an XZ plane for performing default layer slicing on the three-dimensional object model 300. Based on the thickness of the default layer that the three-dimensional printing apparatus 120 is able to process, the processor 110 slices the three-dimensional object model 300 into three layers, i.e., a layer 310, a layer 320, and a layer 330. A thickness of each of the layers 310 to 330 is equal to a thickness of a default layer used whenever the three-dimensional apparatus 120 performs a single printing process. It should be noted that the descriptions only provide an example for a relation between the thicknesses of the default layer and the sub-slicing layer when a three-dimensional object model is sliced according to an embodiment of the disclosure. In FIG. 3B, portions in the respective layers illustrated with solid lines are portions that need to be formed, and those other than the portions illustrated with solid lines are portions that do not need to be formed. Taking the layer 310 as an example, a portion of the layer 310 corresponding to the three-dimensional object model 300 is the top of the triangular three-dimensional object. Thus, the portion that needs to be formed in the layer 310 is only a small portion at the right end illustrated with solid lines in the drawing (as shown in a forming block 311 in FIG. 3C).

FIG. 3C is a schematic view illustrating a three-dimensional object formed by curing and stacking the forming material after the three-dimensional printing apparatus prints with the forming material layer-by-layer based on the layers 310, 320, and 330. In FIG. 3C, the processor 110 respectively outputs the layers 310, 320, and 330 as the image files in the format that the three-dimensional printing apparatus 120 is able to process to the three-dimensional printing apparatus 120. Based on the image files, the three-dimensional printing apparatus 120 sequentially prints out and stacks a forming block 331, a forming block 321, and the forming block 311 to form the three-dimensional object. The forming block 311, the forming block 321, and the forming block 331 respectively correspond to the layer 310, the layer 320, and the layer 330.

Referring to FIGS. 3D, 3E, and 3F according to an embodiment of the disclosure, FIGS. 3D and 3E are schematic side views illustrating the XZ plane where the three-dimensional object model 300 shown in FIG. 3A is sliced into a plurality of sub-slicing layers, and the sub-slicing layers are merged to form a plurality of grey-scale slicing layers. In the embodiment, the merging number M of the slicing layers is set as 2, and in FIG. 3, it is assumed that the three-dimensional object model 300 may be sliced into three layers (i.e., N=3) based on the thickness of the default layer that the three-dimensional printing apparatus 120 is able to process. Thus, in FIG. 3D, the three-dimensional object model 300 may be sliced into 6 sub-slicing layers (M=2, and N=3), i.e., a sub-slicing layer 341, a sub-slicing layer 342, a sub-slicing layer 351, a sub-slicing layer 352, a sub-slicing layer 361, and a sub-slicing layer 362. Similar to the illustration of FIG. 3B, portions of the respective sub-slicing layers illustrated with solid lines in FIG. 3D are portions that need to be formed, and those other than the portions illustrated with solid lines are portions that do not need to be formed. Taking the sub-slicing layer 362 as an example, a portion of the three-dimensional object model 300 corresponding to the sub-slicing layer 362 is the bottom of the triangular three-dimensional object. Therefore, the portion of the sub-slicing layer 362 that needs to be formed is the portion marked with solid lines and taking up almost the whole sub-slicing layer 362. In the embodiment, M may be a natural number equal to or greater than 2.

The processor 110 may merge a default number of adjacent sub-slicing layers to form a plurality of grey-scale slicing layers. Here, the default number (M) is 2. In other words, each two adjacent sub-slicing layers are merged to form a grey-scale slicing layer. Specifically, a thickness of the grey-scale slicing layer in the embodiment of the disclosure is equal to the thickness of the default layer used whenever the three-dimensional printing apparatus 120 performs a single printing process. In addition, the grey-scale slicing layers are formed by merging each two adjacent sub-slicing layers in the embodiment. Thus, the thickness of each of the sub-slicing layers 341 to 361 is a half of the thickness of the default layer of the three-dimensional printing apparatus 120.

FIG. 3E is a schematic view illustrating a plurality of grey-scale slicing layers formed by merging all the sub-slicing layers in FIG. 3D. In the embodiment, the sub-slicing layers 341 and 342 are merged to form a grey-scale slicing layer 340, the sub-slicing layers 351 and 352 are merged to form a grey-scale slicing layer 350, and the sub-slicing layers 361 and 362 are merged to form a grey-scale slicing layer 360. The thickness of each of the grey-scale slicing layers 340, 350, and 360 is equal to the thickness of the default layer used whenever the three-dimensional printing apparatus 120 performs a single printing process.

Referring to FIG. 3E, the processor 110 merges each two of the six sub-slicing layers to form the grey-scale slicing layers 340, 350, and 360 and outputs the grey-scale slicing layers 340, 350, and 360 as image files in a format that the three-dimensional printing apparatus 120 is able to process to the three-dimensional printing apparatus 120.

Then, referring to FIG. 3F, FIG. 3F is a schematic view illustrating a three-dimensional object formed by curing and stacking the forming material after the three-dimensional printing apparatus prints with the forming material layer-by-layer based on the grey-scale slicing layers 340, 350, and 360. After the processor 110 outputs the grey-scale slicing layers 340, 350, and 360 as the image files in the format that the three-dimensional printing apparatus 120 is able to process to the three-dimensional printing apparatus 120, the three-dimensional printing apparatus 120 prints out and stacks a forming block 345, a forming block 355, and a forming block 365 based on the image files. In addition, the forming blocks 345, 355, and 365 respectively correspond to the grey-scale slicing layers 340, 350, and 360.

Comparing the printed three-dimensional objects shown in FIGS. 3C and 3F, in the inclined portions of the two three-dimensional objects equivalent to the portion of the inclined side of the triangular three-dimensional object of the three-dimensional object model 300, the edge of the object printed based on FIGS. 3D to 3F is smoother. This is because the object based on FIGS. 3D to 3F is printed by slicing the three-dimensional object model 300 into the sub-slicing layers whose thickness is thinner than the thickness of the default layer compatible with the three-dimensional printing apparatus 120 and then merging the sub-slicing layers into grey-scale slicing layers, as shown in FIGS. 3D to 3F.

It should be noted that, for the ease of description, the number of slicing layers described herein is limited. However, the number of slicing layers adopted in the actual practice will be far greater than the number of slicing layers adopted in the embodiment. In addition, as the number of sub-slicing layers increases, the edge of the printed three-dimensional object along the forming axis (Z-axis) may become smoother. Moreover, the forming block 345, for example, is obtained by printing based on the grey-scale slicing layer whose thickness is equal to the thickness of the default layer that the three-dimensional printing apparatus 120 is able to process. However, the thickness of the forming block 345 on the forming axis (Z-axis) may be thinner than the thickness of the default layer through the compensation by the printing module of the three-dimensional printing apparatus 120. Details in this regard will be described in the following.

Figure 4:
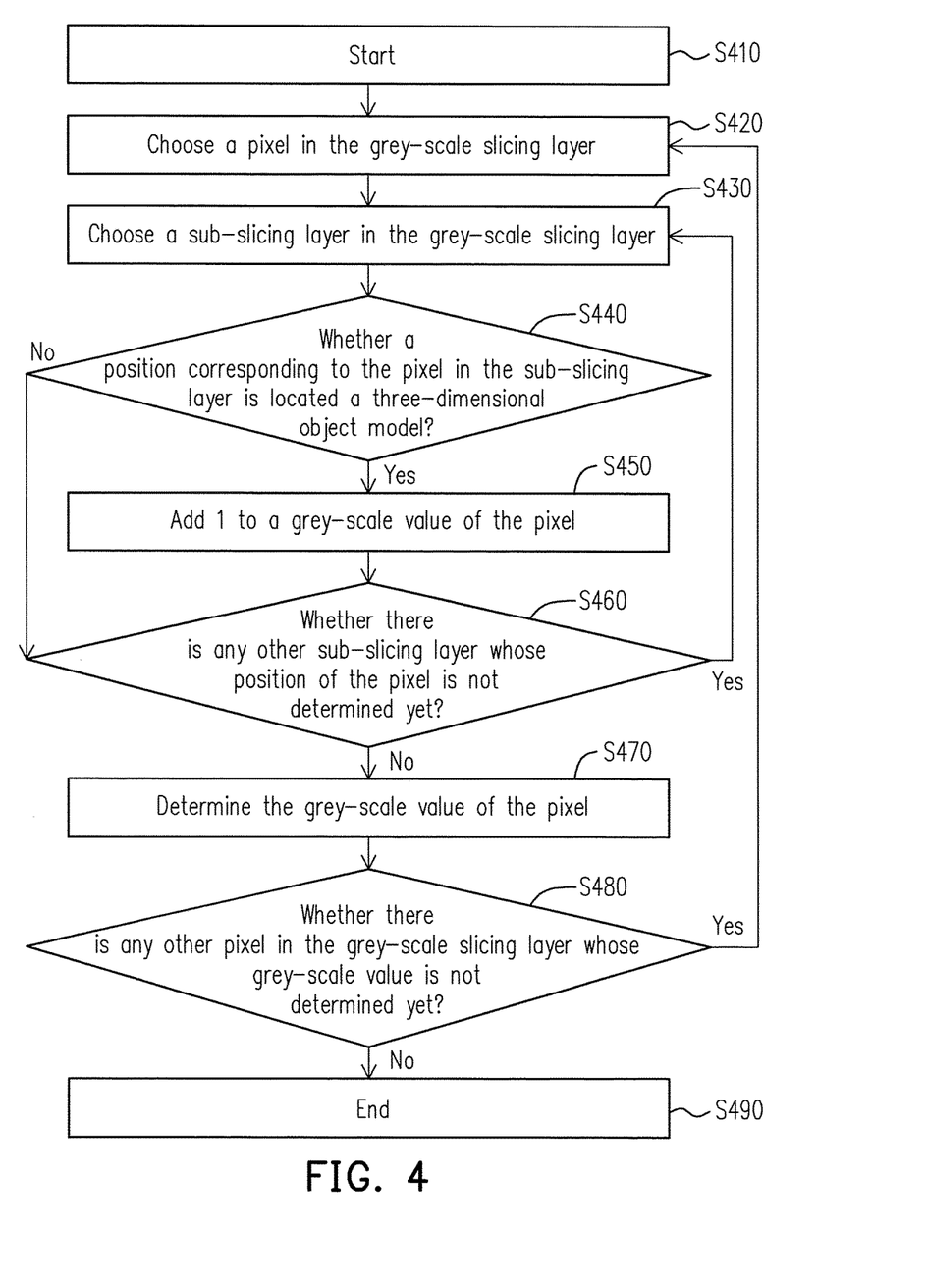
FIG. 4 is a flowchart illustrating calculating a grey-scale value of each pixel of a grey-scale slicing layer according to an embodiment of the disclosure.

FIG. 4 is a flowchart illustrating calculating a grey-scale value of each pixel of a grey-scale slicing layer according to an embodiment of the disclosure. Referring to FIG. 4, at Step S410, grey-scale values of all pixels in one of the grey-scale slicing layers start being calculated. At Step S420, one of the pixels whose grey-scale value is not calculated in the grey-scale slicing layer is chosen, the grey-scale value of the chosen pixel is set as 0, and subsequent calculation is performed. At Step S430, one of the sub-slicing layers merged to form the grey-scale slicing layer is chosen. Then, at Step S440, whether a position corresponding to the pixel in the chosen sub-slicing layer is within the portion of the three-dimensional object model in the sub-slicing layer is checked. If the position corresponding to the pixel in the chosen sub-slicing layer is within the portion of the three-dimensional object model in the sub-slicing layer (i.e., determined as "Yes" at Step S440), Step S450, namely adding 1 to the grey-scale value of the pixel, is performed after Step S440, and then Step S460 is performed. If the position corresponding to the pixel in the sub-slicing layer is not within the three-dimensional object model (i.e., determined as "No" at Step S440), Step S460 is performed after Step S440, and no change is made to the grey-scale value of the pixel.

At Step S460, whether there is any other sub-slicing layer in the grey-scale slicing layer not yet undergoing the preceding steps is checked. If there is still a sub-slicing layer not yet undergoing the preceding steps (i.e., determined as "Yes" at Step S460), the flow returns from Step S460 to Step S430 to repeat the steps. If there is no other sub-slicing layer in the grey-scale slicing layer not yet undergoing the preceding steps (i.e., determined as "No" at Step S460), the positions corresponding to the pixel in all the sub-slicing layers are already checked. Therefore, Step S470 is performed after Step S460 to determine the grey-scale value of the pixel. At Step 5480, whether there is still any other pixel whose grey-scale value is not determined yet in the grey-scale slicing layer is checked. If the grey-scale values of all the pixels in the grey-scale slicing layer are determined (i.e., determined as "No", at Step S480), Step S490 is performed after Step S480 to terminate the calculation of the grey-scale values of all the pixels in the grey-scale slicing layer. If there is still any other pixel whose grey-scale value is not determined yet in the grey-scale slicing layer (i.e., determined as "Yes" at Step S480), the flow returns from Step S480 to Step S420, one of the pixel whose grey-scale value is not determined yet is chosen, and the preceding steps are performed again.

Figure 5A:
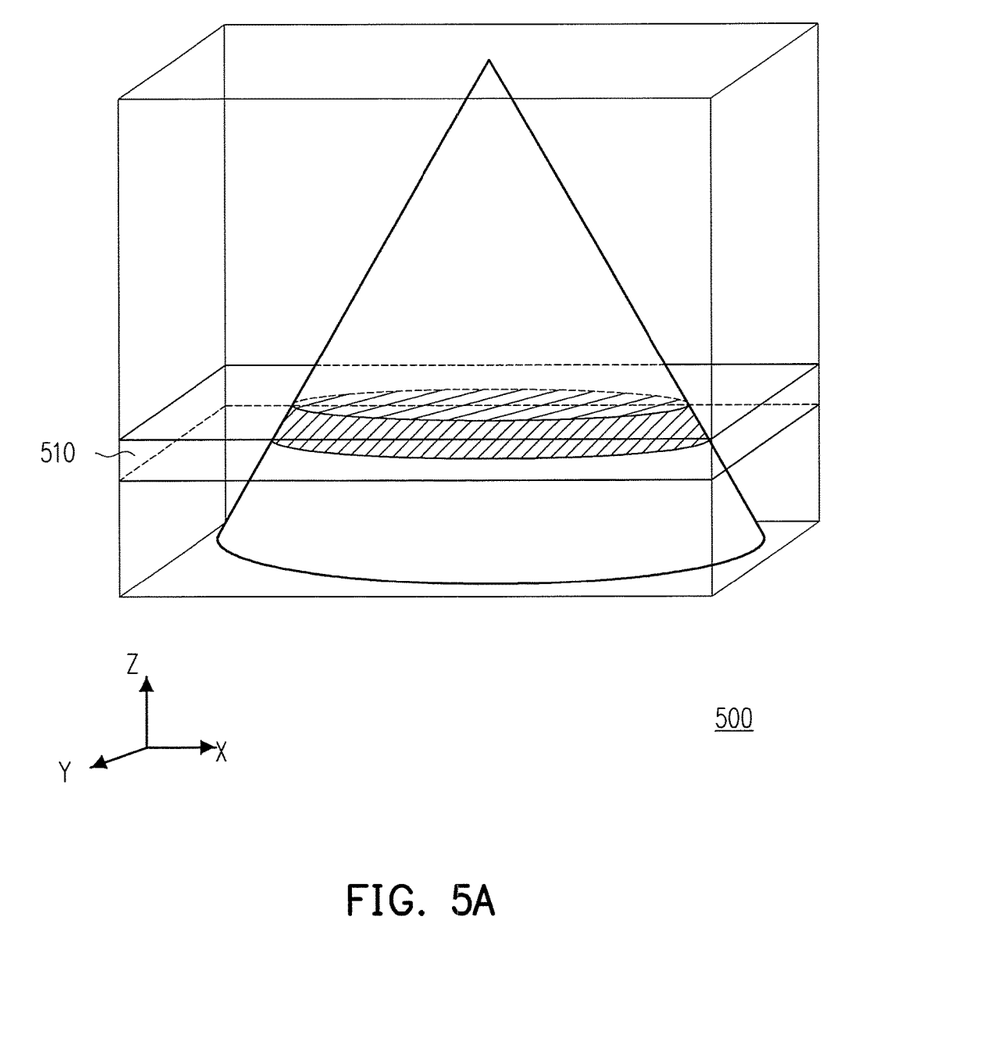
FIGS. 5A to 5C are schematic views illustrating merging sub-slicing layers into grey-scale slicing layers and determining grey-scale values of the grey-scale slicing layers according to an embodiment of the disclosure.
Figure 5B:
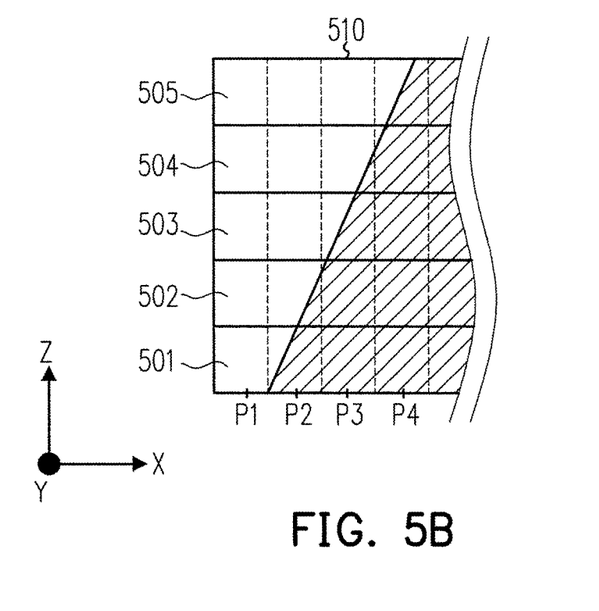
Figure 5C:
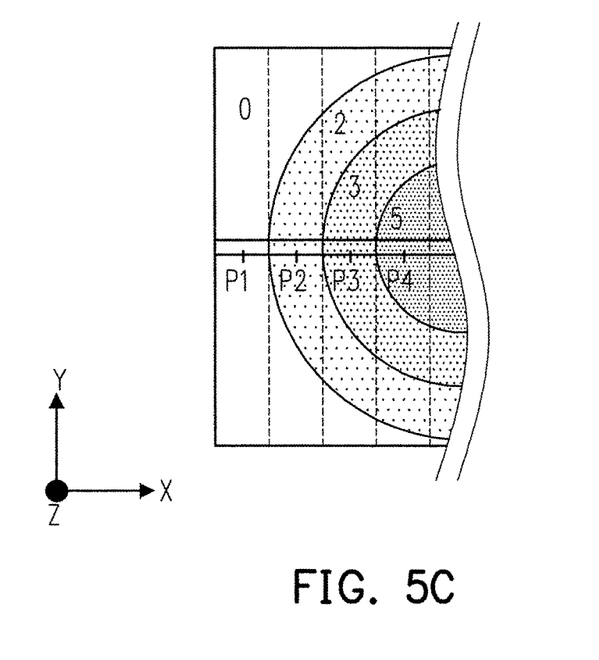

FIGS. 5A to 5C are schematic views illustrating merging sub-slicing layers into grey-scale slicing layers and determining grey-scale values of the grey-scale slicing layers according to an embodiment of the disclosure. Referring to FIG. 5A, a three-dimensional object model 500 is a conical three-dimensional object model constructed by a design software. In the embodiment, the three-dimensional object model 500 is sliced into a certain number of sub-slicing layers, and each five adjacent sub-slicing layers are merged to form a grey-scale slicing layer. A grey-scale slicing layer 510 serves as an example of such grey-scale slicing layer.

FIG. 5B is an enlarged schematic side view illustrating the XZ plane at a left end portion of the grey-scale slicing layer 510, and a grey-scale image file 520 shown in FIG. 5C is a grey-scale image file generated by the processor 110 by merging the sub-slicing layers and corresponding to the grey-scale slicing layer 510. Referring to FIG. 5B, the grey-scale slicing layer 510 in FIG. 5B is obtained by merging sub-slicing layers 501, 502, 503, 504, and 505 by the processor 110. Referring to the grey-scale image file 520 shown in FIG. 5C, according to the coordinate system provided in the drawing, it is known that the image file is equivalent to a cross-section on an XY plane in a space where the three-dimensional object model 500 is located. In the following, four leftmost pixels P1, P2, P3, and P4 in a row of the grey-scale image 520 serve to describe how the grey-scale values of the pixels are determined.

First of all, the pixel P1 is chosen to determine the grey-scale value of the pixel P1. The pixel P1 is the leftmost pixel in the row of the grey-scale image file 520. The grey-scale value of the pixel P1 is initially set at 0. Then, each of the sub-slicing layers forming the grey-scale slicing layer 510 is chosen to check whether a position corresponding to the pixel P1 in the sub-slicing layer is located in the three-dimensional object model 500. If the position corresponding to the pixel P1 in the sub-slicing layer is located in the three-dimensional object model 500, 1 is added to the grey-scale value of the pixel P1. In the case of the pixel P1, none of the corresponding positions in the sub-slicing layers 501 to 505 is located in the three-dimensional object model 500. Therefore, the grey-scale value of the pixel P1 is determined as 0.

Then, the pixel P2 is chosen to determine the grey-scale value of the pixel P2. The grey-scale value of the pixel P2 is initially set at 0. Then, each of the sub-slicing layers forming the grey-scale slicing layer 510 is chosen to check whether a position corresponding to the pixel P2 in the sub-slicing layer is located in the three-dimensional object model 500. If the position corresponding to the pixel P2 in the sub-slicing layer is located in the three-dimensional object model 500, 1 is added to the grey-scale value of the pixel P2. Then, referring to FIG. 5B, the sub-slicing layer 501 is firstly checked. The position corresponding to the pixel P2 of the sub-slicing layer 501 is located in the three-dimensional object model 500 (the portion marked with solid lines in the drawing). Thus, 1 is added to the grey-scale value of the pixel P2, changing the grey-scale value of the pixel P2 to 1. Then, the sub-slicing layer 502 is checked, and the position corresponding to the pixel P2 of the sub-slicing layer 502 is also located in the three-dimensional object model 500. Therefore, 1 is added to the grey-scale value of the pixel P2, changing the grey-scale value of the pixel P2 to 2. Then, the sub-slicing layer 503 is checked, and the position corresponding to the pixel P2 of the sub-slicing layer 503 is not located in the three-dimensional object model 500, so the grey-scale value of the pixel P2 is kept at 2. For the ease of description, the steps concerning the sub-slicing layers 504 and 505 are omitted. The positions corresponding to the pixel P2 in the sub-slicing layers 504 and 505 are not located in the three-dimensional object model 500. Therefore, the grey-scale value of the pixel P2 is kept at 2. So far, there is no other sub-slicing layer whose position of the pixel P2 is not determined in the grey-scale slicing layer 510. Thus, the grey-scale value of the pixel P2 is determined as 2.

Then, the pixel P3 is chosen to determine the grey-scale value of the pixel P3. The grey-scale value of the pixel P3 is initially set at 0. Then, each of the sub-slicing layers forming the grey-scale slicing layer 510 is chosen to check whether a position corresponding to the pixel P3 in the sub-slicing layer is located in the three-dimensional object model 500. If the position corresponding to the pixel P3 in the sub-slicing layer is located in the three-dimensional object model 500, 1 is added to the grey-scale value of the pixel P3. Referring to FIG. 5B, the sub-slicing layer 501 is firstly checked. The position corresponding to the pixel P3 of the sub-slicing layer 501 is located in the three-dimensional object model 500 (a portion marked with solid lines in the drawing), so 1 is added to the grey-scale value of the pixel P3, changing the grey-scale value of the pixel to 1. Then, the sub-slicing layer 502 is checked, and the position corresponding to the pixel P3 of the sub-slicing layer 502 is also located in the three-dimensional object model 500. Therefore, 1 is added to the grey-scale value of the pixel P3, changing the grey-scale value of the pixel P3 to 2. Then, the sub-slicing layer 503 is checked, and the position corresponding to the pixel P3 of the sub-slicing layer 503 is also located in the three-dimensional object model 500. Therefore, 1 is added to the grey-scale value of the pixel P3, changing the grey-scale value of the pixel P3 to 3. For the ease of description, the steps concerning the sub-slicing layers 504 and 505 are omitted. The positions corresponding to the pixel P3 in the sub-slicing layers 504 and 505 are not located in the three-dimensional object model 500. Therefore, the grey-scale value of the pixel P3 is kept at 3. So far, there is no other sub-slicing layer whose position of the pixel P3 is not determined in the grey-scale slicing layer 510. Thus, the grey-scale value of the pixel P3 is determined as 3.

Then, the pixel P4 is chosen to determine the grey-scale value of the pixel P4. The grey-scale value of the pixel P4 is initially set at 0. Then, each of the sub-slicing layers forming the grey-scale slicing layer 510 is chosen to check whether a position corresponding to the pixel P4 in the sub-slicing layer is located in the three-dimensional object model 500. If the position corresponding to the pixel P4 in the sub-slicing layer is located in the three-dimensional object model 500, 1 is added to the grey-scale value of the pixel P4. Referring to FIG. 5B, the sub-slicing layer 501 is firstly checked. The position corresponding to the pixel P4 of the sub-slicing layer 501 is located in the three-dimensional object model 500 (a portion marked with solid lines in the drawing), so 1 is added to the grey-scale value of the pixel P4, changing the grey-scale value of the pixel to 1. Then, the sub-slicing layer 502 is checked, and the position corresponding to the pixel P4 of the sub-slicing layer 502 is also located in the three-dimensional object model 500. Therefore, 1 is added to the grey-scale value of the pixel P4, changing the grey-scale value of the pixel P4 to 2. Then, the sub-slicing layer 503 is checked, and the position corresponding to the pixel P4 of the sub-slicing layer 502 is located in the three-dimensional object model 500. Therefore, 1 is added to the grey-scale value of the pixel P4, changing the grey-scale value of the pixel P4 to 3. For the ease of description, the steps concerning the sub-slicing layers 504 and 505 are omitted. The positions corresponding to the pixel P4 in the sub-slicing layers 504 and 505 are located in the three-dimensional object model 500. Therefore, 2 is added to the grey-scale value of the pixel P4 to change the grey-scale value of the pixel P4 to 5. So far, there is no other sub-slicing layer whose position of the pixel P4 is not determined in the grey-scale slicing layer 510. Thus, the grey-scale value of the pixel P4 is determined as 5.

Accordingly, the grey-scale values of all the pixels in one of the grey-scale slicing layers are calculated in the three-dimensional printing method until there is no pixel whose grey-scale value is not determined in the grey-scale slicing layer. Then, the processor 110 may output the grey-scale slicing layers as image files in a format that the three-dimensional printing apparatus 120 is able to process to the three-dimensional printing apparatus 120 for three-dimensional printing.

In the following, how the printing module of the three-dimensional printing apparatus 120 prints the forming blocks whose thicknesses are thinner than the thickness of the default layer of the three-dimensional printing apparatus 120 based on the different grey-scale values to compensate for the edge differences between the forming blocks is described.

In an embodiment of the disclosure, the printing module of the three-dimensional printing apparatus 120 is compatible with fused deposition modeling where a printing nozzle sprays a forming material. Such printing technique is similar to inkjet printing in two-dimensional printing. The printing nozzle is pneumatic, for example, and controls an amount of sprayed droplets of forming material based on air pressure. Accordingly, the amount of sprayed droplets of forming material is controlled based on the grey-scale value of each pixel. For example, a thickness of a forming block formed by curing five droplets of forming material is equal to the thickness of the default layer of the three-dimensional printing apparatus 120. In the case of FIG. 5C, the grey-scale slicing layer 510 is obtained by merging five sub-slicing layers. The maximum grey-scale value of the pixels of the grey-scale slicing layer 510 is 5, and the minimum grey-scale value of the pixels of the grey-scale slicing layer 510 is 0. Moreover, the thickness of the grey-scale slicing layer 510 is equal to the thickness of the default layer used whenever the three-dimensional printing apparatus 120 performs a single printing process. Therefore, the printing nozzle sprays zero droplet of forming material when printing the pixel P1, two droplets of forming material when printing the pixel P2, three droplets of forming material when printing the pixel P3, and five droplets of forming material when printing the pixel P4. Accordingly, a thickness of a portion of the forming block may be thinner than the thickness of the default layer used whenever the three-dimensional printing apparatus 120 performs a single printing process, thereby compensating for the edge difference between the forming blocks.

In another embodiment of the disclosure, the printing module of the three-dimensional printing apparatus 120 is compatible with digital light processing where an irradiation module irradiates a shaping light pattern on a forming material (e.g., a photocurable resin) to shape the forming material. Compared with fused deposition modeling where the air pressure of the printing nozzle is controlled to spray different amounts of forming material, in the case of digital light processing, the irradiation module may control an intensity of irradiation on the corresponding position of the pixel based on the different grey-scale values of respective pixels in the grey-scale slicing layer to render the thickness of a portion of the forming block formed after the forming material is cured through irradiation thinner than the thickness of the default layer used whenever the three-dimensional printing apparatus 120 performs a single printing process, thereby compensating for the edge difference between the forming blocks. It should be noted that, in the actual practice, if the edge of the three-dimensional object model is irregular or non-linear along the forming axis (e.g., the edge of the three-dimensional object model 500 is linear and has a fixed slope along the forming axis), the sliced sub-slicing layers may be ordered according to the sizes of the cross-sectional areas of the sub-slicing layers and then merged to form the grey-scale slicing layers, so as to maintain the structural strength of the printed forming blocks. In addition, even though the compensation may result in a different order of the sub-slicing layers in the grey-scale slicing layers generated by the processor 110, the grey-scale image files eventually generated are still the same, and whether the sub-slicing layers are ordered is irrelevant.

In view of the foregoing, according to the three-dimensional printing apparatus and the method of three-dimensional printing according to the embodiments of the disclosure, the three-dimensional object model are simulatively sliced into the sub-slicing layers with a thickness thinner than the thickness of the default layer used whenever the three-dimensional printing apparatus performs three-dimensional printing when slicing the three-dimensional object model. Several of the sub-slicing layers are merged to form the grey-scale slicing layer whose thickness is equal to the thickness of the default layer. By calculating the grey-scale value of each pixel in the grey-scale slicing layer, each pixel in the grey-scale slicing layer has more detailed object thickness information than the thickness of the default layer. Accordingly, when the three-dimensional printing apparatus prints the respective sub-slicing layers layer-by-layer, the printing module of the three-dimensional printing apparatus may adjust the amount of the forming material sprayed by the printing nozzle or the intensity of the curing irradiation of the irradiation module based on the grey-scale value of each pixel of the grey-scale slicing layer. Accordingly, a portion of the forming block formed by curing the forming material and corresponding to the edge of the grey-scale slicing layer may be materialized in a thickness thinner than the thickness of the default layer, so as to reduce the pattern along the forming axis (Z-axis).

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of three-dimensional printing for a three-dimensional printing apparatus, the method comprising:
    slicing a three-dimensional object model into a plurality of sub-slicing layers based on a printing plane;
    merging a default number of adjacent sub-slicing layers of the sub-slicing layers to form a plurality of grey-scale slicing layers; and
    performing three-dimensional printing based on the grey-scale slicing layers.

2. The method of three-dimensional printing as claimed in claim 1, wherein a thickness of each of the sub-slicing layers is thinner than a thickness of a default layer used whenever the three-dimensional printing apparatus performs a single printing process, and a thickness of each of the grey-scale slicing layers is equal to the thickness of the default layer used whenever the three-dimensional printing apparatus performs a single printing process.

3. The method of three-dimensional printing as claimed in claim 1, wherein each of the sub-slicing layers comprises a portion of the three-dimensional object model, and the step of merging the default number of adjacent sub-slicing layers of the sub-slicing layers to form the grey-scale slicing layers comprises:
    calculating a grey-scale value of each pixel of each of the grey-scale slicing layers, wherein the grey-scale value of each pixel of each of the grey-scale slicing layers incorporates whether each corresponding pixel of the sub-slicing layers to be merged is located in the portion of the three-dimensional object model, and the grey-scale value of each pixel of each of the grey-scale slicing layers is calculated based on a result of incorporation.

4. The method of three-dimensional printing as claimed in claim 3, wherein a grey-scale value of a specific pixel of a specific grey-scale slicing layer is determined by the number of specific corresponding pixels in the sub-slicing layers to be merged to form the specific grey-scale slicing layer that are located in the portion of the three-dimensional object model.

5. The method of three-dimensional printing as claimed in claim 4, wherein the grey-scale value of the specific pixel is the maximum when the specific corresponding pixels in the sub-slicing layers to be merged to form the specific grey-scale slicing layer are located in the portion of the three-dimensional object model, and the grey-scale value of the specific pixel is the minimum when none of the specific corresponding pixels in the sub-slicing layers to be merged to form the specific grey-scale slicing layer is located in the portion of the three-dimensional object model.

6. The method of three-dimensional printing as claimed in claim 5, wherein the step of performing three-dimensional printing based on the grey-scale slicing layers comprises:
    controlling an amount of forming material sprayed from a printing nozzle of the three-dimensional printing apparatus based on the grey-scale value of each pixel of the grey-scale slicing layers.

7. The method of three-dimensional printing as claimed in claim 5, wherein the step of performing three-dimensional printing based on the grey-scale slicing layers comprises
    adjusting an intensity of irradiation of the three-dimensional printing apparatus on a photocurable liquid forming material based on the grey-scale value of each pixel of the grey-scale slicing layers.

8. A system of three-dimensional printing, comprising:
    a three-dimensional printing apparatus; and
    a processor, coupled to the three-dimensional printing apparatus, wherein the processor slices a three-dimensional object model into a plurality of sub-slicing layers based on a printing plane and merges a default number of adjacent sub-slicing layers of the sub-slicing layers to form a plurality of grey-scale slicing layers, and the three-dimensional printing apparatus performs three-dimensional printing based on the grey-scale slicing layers.

9. The system of three-dimensional printing as claimed in claim 8, wherein a thickness of each of the sub-slicing layers is thinner than a thickness of a default layer used whenever the three-dimensional printing apparatus performs a single printing process, and a thickness of each of the grey-scale slicing layers is equal to the thickness of the default layer used whenever the three-dimensional printing apparatus performs a single printing process.

10. The system of three-dimensional printing as claimed in claim 8, wherein each of the sub-slicing layers comprises a portion of the three-dimensional object model, and merging the default number of adjacent sub-slicing layers of the sub-slicing layers to form the grey-scale slicing layers comprises:
    calculating a grey-scale value of each pixel of each of the grey-scale slicing layers, wherein the grey-scale value of each pixel of each of the grey-scale slicing layers incorporates whether each corresponding pixel of the sub-slicing layers to be merged is located in the portion of the three-dimensional object model, and the grey-scale value of each pixel of each of the grey-scale slicing layers is calculated based on a result of incorporation.

11. The system of three-dimensional printing as claimed in claim 10, wherein a grey-scale value of a specific pixel of a specific grey-scale slicing layer is determined by the number of specific corresponding pixels in the sub-slicing layers to be merged to form the specific grey-scale slicing layer that are located in the portion of the three-dimensional object model.

12. The system of three-dimensional printing as claimed in claim 11, wherein:
    the grey-scale value of the specific pixel is the maximum when the specific corresponding pixels in the sub-slicing layers to be merged to form the specific grey-scale slicing layer are located in the portion of the three-dimensional object model, and the grey-scale value of the specific pixel is the minimum when none of the specific corresponding pixels in the sub-slicing layers to be merged to form the specific grey-scale slicing layer is located in the portion of the three-dimensional object model.

13. The system of three-dimensional printing as claimed in claim 12, wherein the three-dimensional printing apparatus comprises a printing nozzle, the processor controls an amount of forming material sprayed from the printing nozzle based on the grey-scale value of each pixel of the grey-scale slicing layers.

14. The system of three-dimensional printing as claimed in claim 12, wherein the three-dimensional printing apparatus comprises a light source generator, and the processor adjusts an intensity of irradiation of the light source generator on a photocurable liquid forming material based on the grey-scale value of each pixel of the grey-scale slicing layers.

* * * * *